US012512574B2

(12) United States Patent
Benedict et al.

(10) Patent No.: US 12,512,574 B2
(45) Date of Patent: Dec. 30, 2025

(54) WAVEGUIDE COMPONENTS OF WAVEGUIDES FORMED WITH ADDITIVE MANUFACTURING

(71) Applicant: Raytheon Company, Arlington, VA (US)

(72) Inventors: James Benedict, Chelmsford, MA (US); Lawrence A. Binek, Glastonbury, CT (US); Erika Klek, Medford, MA (US)

(73) Assignee: Raytheon Company, Arlington, VA (US)

( * ) Notice: Subject to any disclaimer, the term of this patent is extended or adjusted under 35 U.S.C. 154(b) by 383 days.

(21) Appl. No.: 18/072,516

(22) Filed: Nov. 30, 2022

(65) Prior Publication Data

US 2023/0216170 A1 Jul. 6, 2023

Related U.S. Application Data

(60) Provisional application No. 63/295,441, filed on Dec. 30, 2021.

(51) Int. Cl.
*H01P 3/18* (2006.01)
*H01P 3/20* (2006.01)
(Continued)

(52) U.S. Cl.
CPC .................. *H01P 3/18* (2013.01); *H01P 3/20* (2013.01); *H01P 5/20* (2013.01); *H01P 11/001* (2013.01)

(58) Field of Classification Search
CPC ...... H01P 3/18; H01P 3/20; H01P 5/20; H01P 11/001
(Continued)

(56) References Cited

U.S. PATENT DOCUMENTS

| | | | |
|---|---|---|---|
| 4,167,715 A | 9/1979 | Ohm |
| 10,490,899 B2 | 11/2019 | Wilson et al. |

(Continued)

FOREIGN PATENT DOCUMENTS

| | | |
|---|---|---|
| CN | 209389219 U | 9/2019 |
| EP | 3664216 A1 | 6/2020 |

(Continued)

OTHER PUBLICATIONS

Sun et al., Millimeter-Wave Magneto-Electric Dipole Antenna Array With a Self-Supporting Geometry for Time-Saving Metallic 3-D Printing, IEEE Transactions on Antennas and Propagation, Aug. 18, 2020, pp. 7822-7832, vol. 68, No. 12, Institute of Electrical and Electronics Engineers, Piscataway, New Jersey.

(Continued)

*Primary Examiner* — Rakesh B Patel

(74) *Attorney, Agent, or Firm* — Schwegman Lundberg & Woessner, P.A.

(57) ABSTRACT

A radio frequency ("RF") waveguide device fabricated by additive manufacturing is provided that includes a RF channel comprising a wall and a RF component comprising an unsupported span extending from the wall of the RF channel. The unsupported span can include at least one unsupported surface extending from the wall at an oblique angle relative to the wall. The RF component formed in this manner with additive manufacturing does not negatively impact the RF performance of the RF waveguide.

7 Claims, 7 Drawing Sheets

(51) Int. Cl.
*H01P 5/20* (2006.01)
*H01P 11/00* (2006.01)

(58) Field of Classification Search
USPC ....... 333/122, 135, 137, 157, 208–212, 239, 333/248–249
See application file for complete search history.

(56) References Cited

U.S. PATENT DOCUMENTS

| | | | | |
|---|---|---|---|---|
| 10,573,949 | B2 | 2/2020 | Fluitt et al. | |
| 10,833,382 | B2 | 11/2020 | Sysouphat | |
| 10,862,186 | B2 | 12/2020 | De Rijk et al. | |
| 10,985,448 | B2 | 4/2021 | Bongard et al. | |
| 11,031,669 | B2 | 6/2021 | De Rijk et al. | |
| 11,128,034 | B2 | 9/2021 | Hollenbeck et al. | |
| 2019/0190161 | A1 | 6/2019 | Hollenbeck et al. | |
| 2020/0194860 | A1 | 6/2020 | Hollenbeck et al. | |
| 2020/0274215 | A1 | 8/2020 | Morris et al. | |
| 2022/0190460 | A1* | 6/2022 | Binek | H01P 1/022 |
| 2022/0258244 | A1* | 8/2022 | Benedict | B22F 10/66 |

FOREIGN PATENT DOCUMENTS

| | | | |
|---|---|---|---|
| FR | 3087954 | A1 | 5/2020 |
| SU | 327869 | A1 | 2/1980 |
| WO | WO 2017/203568 | A1 | 11/2017 |
| WO | WO 2021/005554 | A1 | 1/2021 |
| WO | WO 2021/009667 | A1 | 1/2021 |

OTHER PUBLICATIONS

Zhao et al., Fully 3-D-Printed Frequency-Scanning Slotted Waveguide Array With Wideband Power-Divider, IEEE Antennas and Wireless Propagation Letters, Dec. 1, 2019, pp. 2756-2760, vol. 18, No. 12, Institute of Electrical and Electronics Engineers, Piscataway, New Jersey.
International Search Report for International Application No. PCT/US2022/051437 dated Mar. 20, 2023, 28 pages.
Calignano et al., Accuracy of complex internal channels produced by laser powder bed fusion process, Journal of Manufacturing Processes, Jun. 2020, 2 pages, vol. 54, Elsevier, Netherlands.
Calignano et al., High-performance microwave waveguide devices produced by laser powder bed fusion process, Procedia CIRP, 2019, pp. 85-88, vol. 79, Elsevier, Netherlands.

* cited by examiner

WAVEGUIDE COMPONENTS OF WAVEGUIDES FORMED WITH ADDITIVE MANUFACTURING

RELATED APPLICATIONS

This application claims the benefit of U.S. Provisional Patent Application No. 63/295,441, filed Dec. 30, 2021, which is incorporated by reference in its entirety herein.

BACKGROUND

A waveguide is a structure that guides waves from one point to another. Ideally, a waveguide guides a wave, such as an electromagnetic wave or sound wave, with minimal loss in a predetermined direction. In one example, a waveguide can be constructed to carry electromagnetic waves over a wide portion of the electromagnetic spectrum. Such waveguides can be referred to as radio frequency ("RF") waveguides.

Typically, RF waveguides are formed via casting and brazing manufacturing processes. For example, RF waveguide devices, including channels and the like, can be initially formed with a casting process. Then, specialty RF fixtures or RF components can be manufactured and brazed into position on or within the waveguide devices. While such manufacturing processes are robust, these processes can require specialized fixtures for manufacturing the waveguide components followed by complex assembly and assembly processes to join the components of the waveguide device. This can result in increased costs, complexity, and time of manufacturing.

Increasingly, additive manufacturing or three-dimensional printing is being incorporated into various manufacturing processes to produce not only prototype parts, but end products. Additive manufacturing refers to a variety of processes in which material is deposited, joined, or solidified under computer control to create a three-dimensional object. The material is added together or joined (such as plastics, liquids, or powder grains being fused together) typically layer by layer.

However, when creating complex parts such as specialty components required for a RF waveguide, the use of additive manufacturing can have several drawbacks. For example, certain components that span between two other parts of a waveguide device must be supported during the additive manufacturing. Otherwise, such unsupported spans can cause build failures due to excessive deformation occurring during the additive manufacturing process. However, when supporting structures are used during the additive manufacturing process, such structures typically then need to be removed during a post-processing manufacturing step, such as via a milling, cutting or other process. In other examples, some complex components created by additive manufacturing can result in components with defects such as a surface finish containing distortions or witness lines, or with other defects that can be undesirable in certain applications. For example, in a RF waveguide device, such defects in a waveguide component can negatively affect the RF performance of the waveguide device.

SUMMARY

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter. Various features, elements or components are presented below to provide a thorough description and understanding of the present disclosure. However, it will be apparent that the various features, elements or components can be combined in any suitable combination and are not limited to combinations described herein.

In order to facilitate the use of additive manufacturing processes in fabricating a RF waveguide device with complex RF components, the RF components can be modified as compared to traditional RF components, such that when the RF components are built using additive manufacturing, the RF components are formed while mitigating any distortions resulting from the manufacturing process. Further, such RF components can be formed to not negatively impact the RF performance of the RF waveguide device.

In one example of the present disclosure, a radio frequency ("RF") waveguide device can be provided. The RF waveguide device can be fabricated by additive manufacturing. The RF waveguide device can comprise a RF channel comprising a wall, and a RF component comprising an unsupported span extending from the wall of the RF channel. The unsupported span can comprise at least one unsupported surface extending from the wall at an oblique angle relative to the wall. The RF component can be formed to not negatively impact the RF performance of the RF waveguide device, meaning that the RF component can be formed within the RF waveguide device, such that the RF waveguide device meets all performance specifications and functions as intended for a particular application.

In one example, the unsupported surface can comprise a surface finish with a roughness average (RA) of less than 250 micro inches. In one example, the unsupported surface can comprise a surface finish with an Ra of less than 125 micro inches. In one example, the oblique angle can be is between 25 degrees and 65 degrees relative to the wall. In one example, the oblique angle can be at 45 degrees relative to the wall.

In one example, the at least one unsupported surface of the unsupported span comprises a first unsupported surface and a second unsupported surface. The first unsupported surface can extend from the wall at a first oblique angle and the second unsupported surface can extend from the wall at a second oblique angle. In one example, the first and second unsupported surfaces can be joined together at an apex between the first and second unsupported surfaces. In some examples, the first oblique angle can be equal to the second oblique angle.

In some examples, the RF component can comprise a waveguide splitter disposed within a horn section of the RF channel. In some examples, the first and second unsupported surfaces can be joined together to form a chevron profile on the waveguide splitter. In some examples, the at least one unsupported surface forms an arced profile on the unsupported span.

In one example, the RF component can comprise a magic tee and the unsupported span can comprise a magic tee roof. The at least one unsupported surface of the unsupported span can comprise a first unsupported surface and a second unsupported surface. The first and second unsupported surfaces can form a void in the magic tee roof. In some examples, the void can comprise a pyramidal shape.

In some examples, the unsupported surface can comprise a double-beveled profile.

In another example of the present disclosure, a method for forming a radio frequency ("RF") waveguide device by additive manufacturing is provided. The method can comprise fabricating a RF channel comprising a wall, and fabricating a RF component. The RF component can comprise an unsupported span extending from the wall of the RF channel. The unsupported span can be formed at least in part by building up at least one unsupported surface to extend from the wall at an oblique angle relative to the wall.

The unsupported span can be fabricated without the use of an underlying supporting structure. Further, the unsupported span can be completed using additive manufacturing without post processing machining, and the RF component can be fabricated to not negatively impact the RF performance of the RF waveguide device, meaning that the RF component can be formed within the RF waveguide device, such that the RF waveguide device meets all performance specifications and functions as intended for a particular application.

In some examples, the first oblique angle can be equal to the second oblique angle. In some examples, the RF component can comprise a waveguide splitter disposed within a horn section of the RF channel. The first and second unsupported surfaces can join together to form a chevron profile on the waveguide splitter. In one example, the at least one unsupported surface can be fabricated in an arced or other curved, nonlinear profile (i.e., a profile having one or more curves. For example, a curved profile, such as an arc) on the unsupported span.

In one example, the RF component can comprise a magic tee and the unsupported span can comprise or be formed in or as part of a magic tee roof. The at least one unsupported surface of the unsupported span can comprise a first unsupported surface and a second unsupported surface. The first and second unsupported surfaces can be fabricated to form a void in the magic tee roof. The void can comprise a pyramidal shape.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
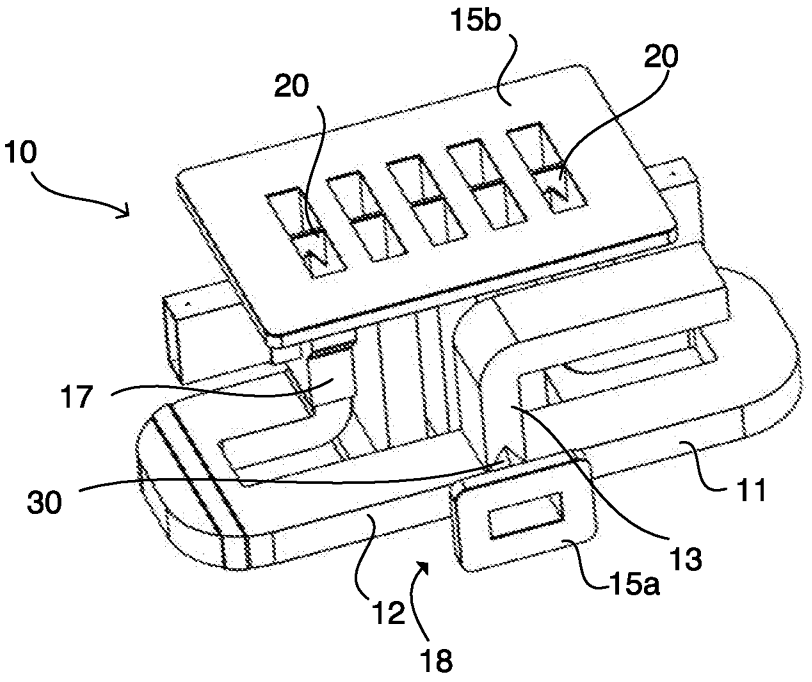
FIG. 1A is a front, top, left, isometric view of one example of a radio frequency ("RF") waveguide device comprising RF components, in accordance with an example of the present disclosure.
Figure 1B:
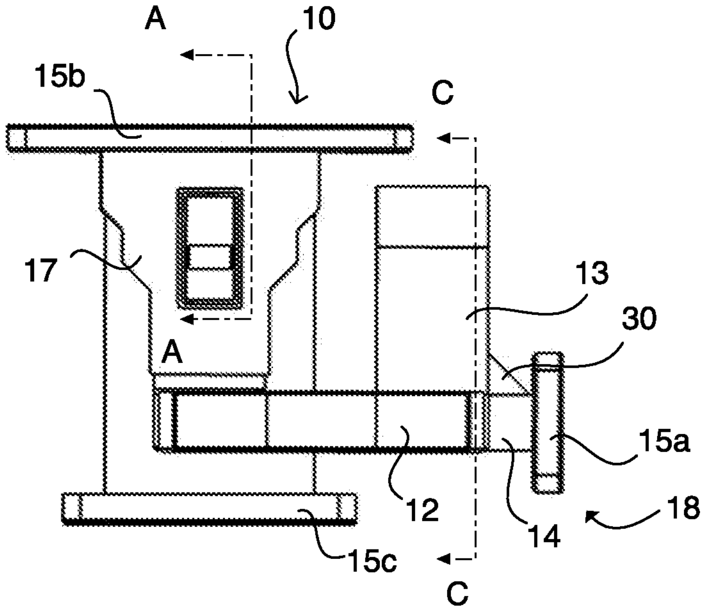
FIG. 1B is a side view of the RF waveguide device of FIG. 1A.
Figure 1C:
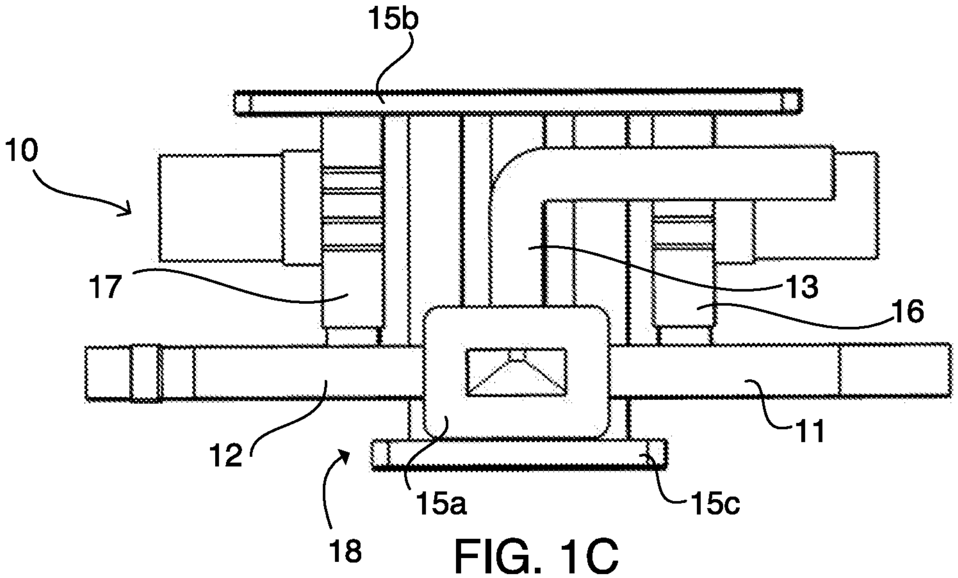
FIG. 1C is a front view of the RF waveguide device of FIG. 1A.
Figure 1D:
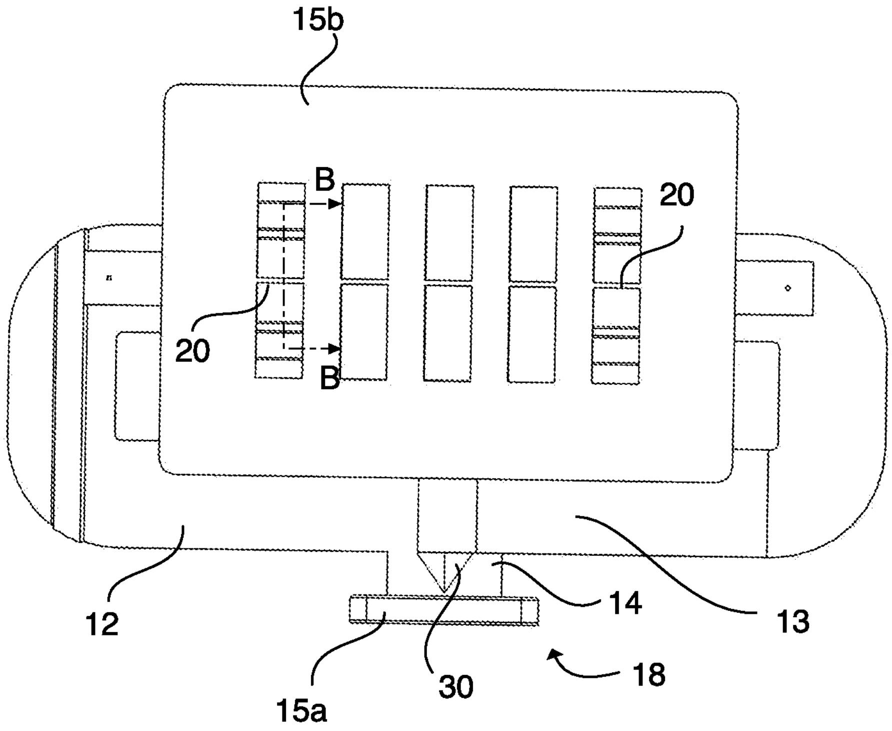
FIG. 1D is a top view of the RF waveguide device of FIG. 1A.

Reference will now be made to the exemplary embodiments illustrated, and specific language will be used herein to describe the same. It will nevertheless be understood that no limitation of the scope of the invention is thereby intended.

DETAILED DESCRIPTION

To further describe the present technology, examples are now provided with reference to the figures. With reference to FIGS. 1A-1D, a radio frequency ("RF") waveguide device 10 is provided. The RF waveguide device 10 is an exemplary waveguide device that guides RF waves through the RF waveguide device 10. The waveguide device 10 can comprise a large format waveguide device, such as a C-band waveguide device. However, this is not intended to be limiting in any way. The waveguide 10 can comprise a monolithic configuration. The term "monolithic" covers any structure that is printed as a single unitary part using additive manufacturing. The "monolithic" structure (e.g., waveguide) can be a single-material, unitary structure manufactured by an additive manufacturing system capable of printing unitary structures using a single material throughout the entire structure. Additionally, "monolithic" can also refer to a multi-material structure (e.g., waveguide) manufactured by an additive manufacturing system capable of printing a unitary structure using two or more materials to print the structure during a single additive manufacturing process.

The RF waveguide device 10 can comprise waveguide channels such as waveguide channels 11, 12, 13, 14. The waveguide channels 11, 12, 13, 14 can extend between one or more ports 15*a*, 15*b*, 15*c* to guide RF waves from a RF wave source to a RF wave destination, such as another RF wave device.

In this example, the RF waveguide device 10 can comprise channels 11, 12 that each have a respective a horn section 16, 17. Furthermore, in the waveguide device 10, the waveguide channels 11, 12, 13, 14 can be joined together via a magic tee 18 (i.e. a waveguide tee, such as a four port waveguide tee that is a combination of an E-plane and an H-plane waveguide tee)

The RF waveguide device 10 can comprise various RF components that are formed throughout the waveguide device 10. For example, the RF waveguide device can include one or more RF waveguide splitters 20. The RF waveguide splitters 20 can be disposed in horn sections 16, 17 of respective channels 11, 12. The RF waveguide device 10 can further comprise a magic tee roof 30. The magic tee roof 30 can be disposed in a waveguide channel 14 at the junction of waveguide channels 11, 12, 13, 14.

In this example, the RF components of the waveguide device 10, such as the waveguide splitter 20, the magic tee roof 30 and other components, can be formed using an additive manufacturing process. In this example, the additive manufacturing process can be laser powder bed fusion. The structure of the RF components can be modified as compared to traditional RF components such that the RF components of the RV waveguide device 10 can be created using additive manufacturing without the need for support structures and without negatively affecting the performance of the RF waveguide device 10.

Waveguide Splitter

Figure 2:
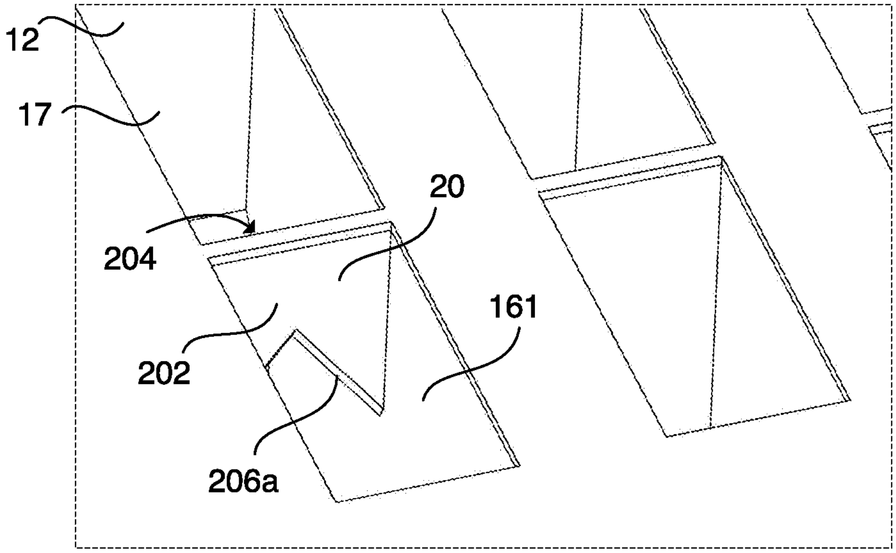
FIG. 2 is an enlarged partial isometric view of the RF waveguide device of FIG. 1A showing an exemplary RF waveguide splitter.
Figure 3:
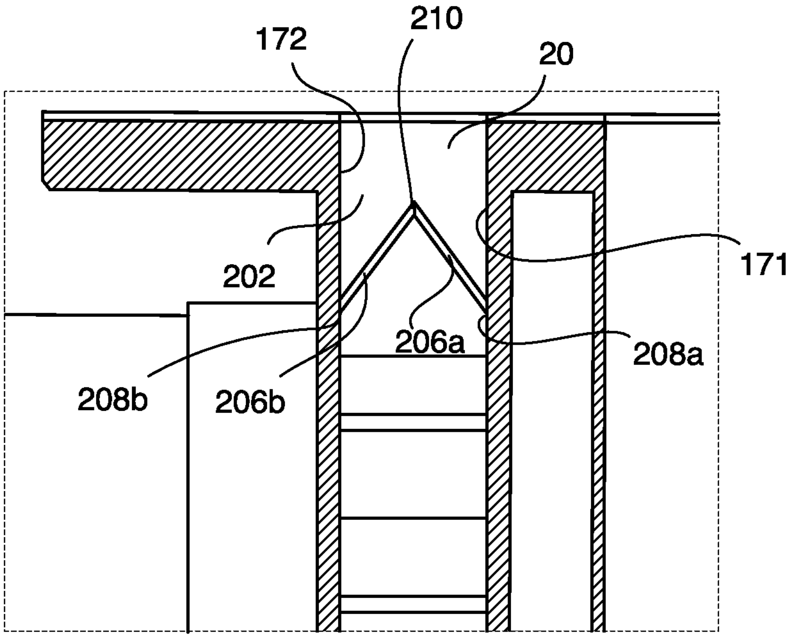
FIG. 3 is a section view of the RF waveguide device of FIG. 1A, taken along the line A-A in FIG. 1B.

As mentioned above, one of the RF components that can be included on the RF waveguide device 10 is a waveguide splitter 20. As shown in FIGS. 1A to 4D, the waveguide splitter 20 can be disposed in a horn section 16, 17, of a waveguide channel 11, 12. FIGS. 2 and 3 show an exemplary waveguide splitter 20 according to the present disclosure. The waveguide splitter 20 can comprise a front surface 202, a back surface 204 opposite the front surface 202, and at least one unsupported surface. In the example shown in FIGS. 2 and 3, the at least one unsupported surface can comprise a first unsupported surface 206*a* and a second unsupported surface 206*b*.

The waveguide splitter 20 can extend from a first wall 171 of the horn section 17 of the waveguide channel 12 to a second wall 172. The waveguide splitter 20 thus forms a span extending from the first wall 171 across to the second wall 172 of the waveguide channel 12. The span can be considered an unsupported span, and the unsupported surfaces 206*a*, 206*b* can be termed unsupported surfaces because the waveguide splitter 20 with the configuration shown and described herein can be formed using additive manufacturing without the need for supporting structure underneath the waveguide splitter 20.

In this example, during an additive manufacturing process of the waveguide device 10, layers are joined, added, or built up from the bottom towards the top of the waveguide device 10. Each of the unsupported surfaces 206*a*, 206*b* can extend up and outward from the walls 171, 172 at an oblique angle relative to the walls 171, 172 (viewing FIG. 3 as a reference). The oblique angles of the unsupported surfaces 206*a*, 206*b* relative to the walls 171, 172, respectively, can be between 25 degrees and 65 degrees. In some examples, the oblique angles of the unsupported surfaces 206*a*, 206*b* relative to the walls 171, 172, respectively, can be equal to one another. In some examples, the oblique angles of the unsupported surfaces 206*a*, 206*b* relative to the walls 171, 172, respectively, can be 45 degrees.

In this example, the unsupported surfaces 206*a*, 206*b* extend from build-out points 208*a*, 208*b* until the unsupported surfaces 206*a*, 206*b* meet together at a high point 210 or apex between the unsupported surfaces 206*a*, 206*b*. In this example, the unsupported surfaces 206*a*, 206*b* extend linearly to the high point 210 or apex. In this manner, the unsupported surfaces 206*a*, 206*b* form a chevron profile in the waveguide splitter 20.

With the unsupported surfaces 206*a*, 206*b* extending at an oblique angle relative to the walls 171, 172, the waveguide splitter 20 can be formed as an unsupported span during the additive manufacturing process. That is, because of its configuration, no supporting structure is required to create any part of the waveguide splitter 20 during the manufacturing process. Furthermore, by forming the waveguide splitter 20 with the unsupported surfaces 206*a*, 206*b* as described above, the waveguide splitter 20 can be formed while mitigating defects or deformations in the waveguide splitter 20. In one example, the waveguide splitter 20 can be formed with a surface finish with a Ra of less than 250 micro inches. In another example, the waveguide splitter 20 can be formed with a surface finish with a Ra of less than 125 micro inches. By achieving these surface finishes, the waveguide splitter 20 can be formed using additive manufacturing while not negatively impacting performance of the waveguide device 10, meaning that the RF component can be formed within the RF waveguide device 10, such that the RF waveguide device 10 meets all performance specifications and functions as intended for a particular application. In other words, negatively impacting the performance of the RF waveguide device 10 means that the performance specifications and functions of the RF waveguide device 10 are not met in one or more ways due to one or more aspects or characteristics of the waveguide splitter 20 RF component. For example, if the surface finish is rough, insertion losses can increase rapidly. If multiple components are cascaded, the insertion loss continues to increase with each component. Surface roughness effects are especially detrimental at mmW frequencies, where features are comparative to a wavelength. As such, it is advisable to minimize surface roughness as much as possible.

The above described example is not intending to be limiting in any way. Other variations of the waveguide splitter 20 are also possible. For example, the at least one unsupported surface of the waveguide splitter 20 can be formed as an arced surface. In this example, the unsupported surface can extend from the build-out points 208*a*, 208*b*. At the build-out points 208*a*, 208*b*, the unsupported surface can extend up and outward from the walls 171, 172 in an arc, with lines at various points being at oblique angles relative to the walls 171, 172. The unsupported surface can continue on in an arced profile rather than a chevron profile. In another example, the unsupported surface can comprise a single, linear surface that extends between the walls 171, 172 at an oblique angle relative to the walls 171, 172.

The unsupported surface can comprise a single beveled or double beveled profile forming a blade-like edge. In the example shown, the unsupported surfaces 206*a*, 206*b* can comprise a double-beveled profile forming a blade-like edge. This can further enhance the surface finish of the waveguide splitter 20 as it is built up from the build-out points 208*a*, 208*b* during an additive manufacturing process. However, this is not intended to be limiting and other variations can also be used.

Figure 4A:
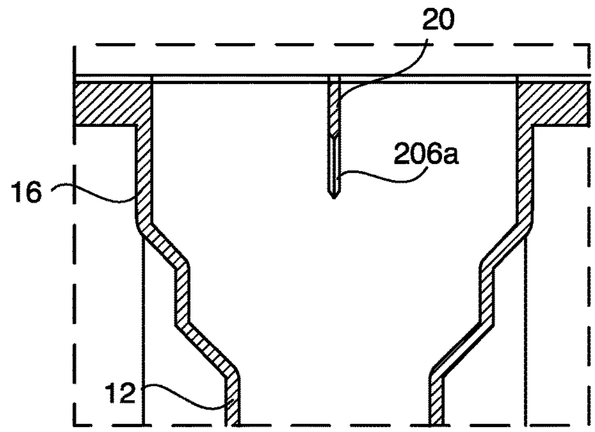
FIGS. 4A, 4B, 4C, and 4D are section views of the RF waveguide device of FIG. 1A, taken along the line B-B in FIG. 1D, showing examples of an unsupported surface of a RF waveguide splitter.
Figure 4B:
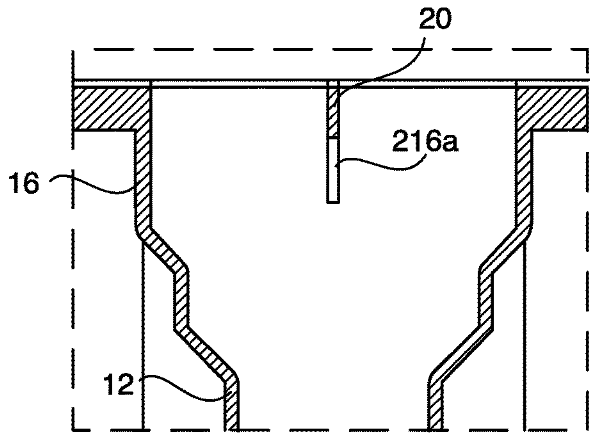
Figure 4C:
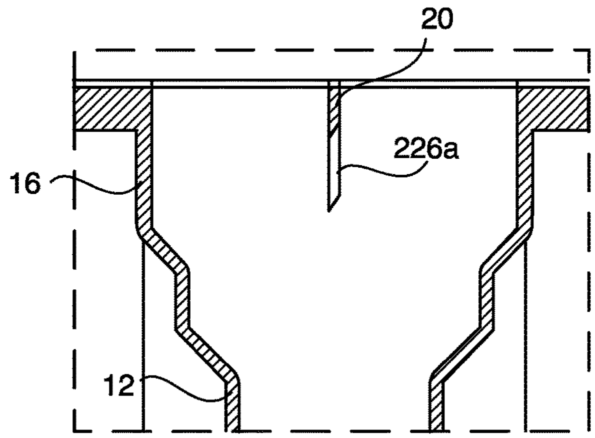
Figure 4D:
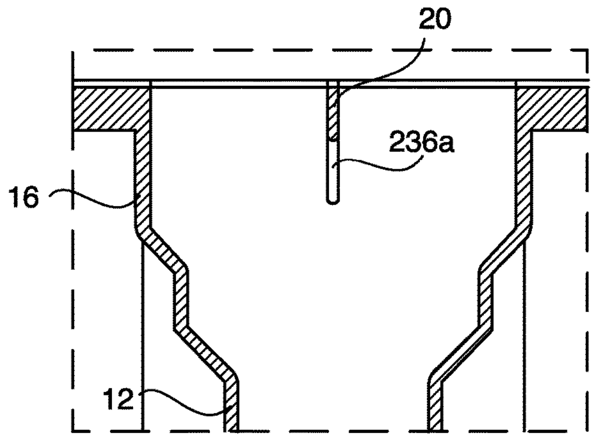

FIGS. 4A-4D show exemplary profiles of an unsupported surface of a waveguide splitter 20. In FIG. 4A, an unsupported surface 206*a* comprises a double-beveled profile as mentioned above. In FIG. 4B, the waveguide splitter 20 is shown to comprise an unsupported surface 216*a* having a flat profile. In FIG. 4C, the waveguide splitter 20 is shown to comprise an unsupported surface 226*a* having a single-beveled profile having a blade-like edge. In FIG. 4D, the waveguide splitter 20 is shown to comprise an unsupported surface 236*a* having a rounded profile.

Magic Tee Roof

Referring to FIGS. 1A-1D, and 5A-5C, as mentioned above, another RF component that can be included in the RF waveguide device 10 is a magic tee roof 30 of a magic tee 18 of the waveguide device 10. The magic tee roof 30 can be disposed in a waveguide channel 14 of a magic tee 18 of the waveguide device 10. The magic tee roof 30 can be formed on an upper wall 141 of the waveguide channel 14. The magic tee roof 30 can comprise a first unsupported surface 302 and a second unsupported surface 304. The unsupported surfaces 302, 304 can define planar surfaces that extend upward and outward from the upper wall 141 of the waveguide channel 14 at an oblique angle relative to the upper wall 141 of the waveguide channel 14 (using FIGS. 5A and 5B as references).

Figure 5A:
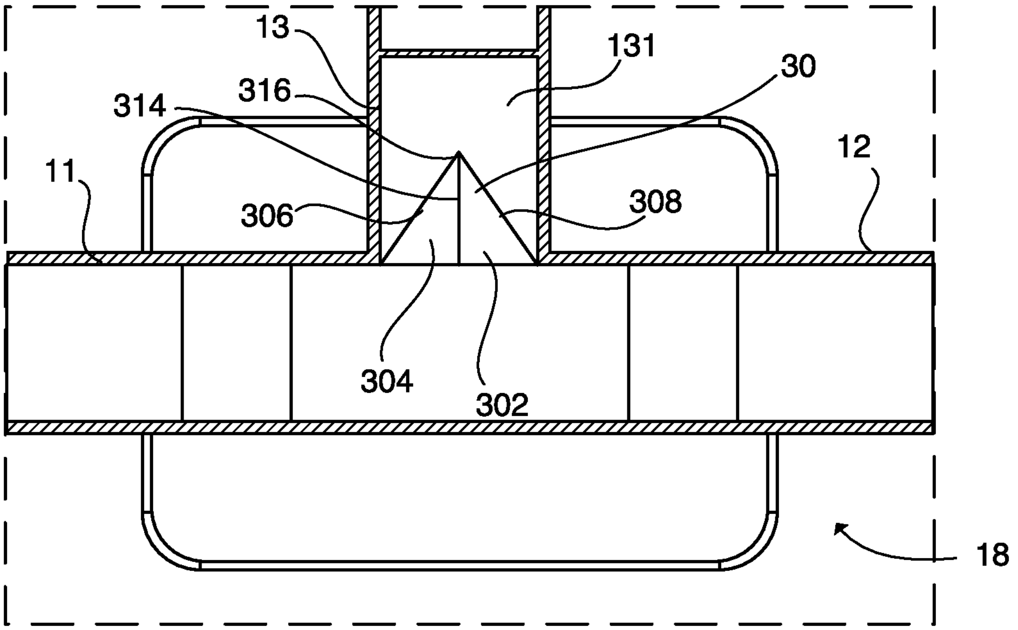
FIG. 5A is a section view of the RF waveguide device of FIG. 1A, taken along the line C-C of FIG. 1B.

In this example, during an additive manufacturing process of the waveguide device 10, layers are joined, added, or built up from the bottom towards the top of the waveguide device as it is shown to be oriented in FIG. 5A. The oblique angles of the unsupported surfaces 302, 304 relative to the upper wall 141 can be between 25 degrees and 65 degrees. In some examples, the oblique angles of the unsupported surfaces 302, 304 relative to the wall 141 can be equal to one another. In some examples, the oblique angles of the unsupported surfaces 302, 304 relative to the upper wall 141 can be 45 degrees.

With the unsupported surfaces 302, 304 extending at an oblique angle relative to the upper wall 141, the magic tee roof 30 can be formed as an unsupported span during the additive manufacturing process. That is, because of its configuration, no supporting structure is required to create the magic tee roof 30 during the manufacturing process. Furthermore, by forming the magic tee roof 30 with the unsupported surfaces 302, 304 as described above, the magic tee roof 30 can be formed while mitigating defects or deformations in the magic tee roof 30. In one example, the magic tee roof 30 can be formed with a surface finish with a Ra of less than 250 micro inches. In another example, the magic tee roof 30 can be formed with a surface finish with a Ra of less than 125 micro inches. By achieving these surface finishes, the magic tee roof 30 can be formed using additive manufacturing while not negatively impacting performance of the waveguide device 10, meaning that the magic tee roof 30 type RF component can be formed within the RF waveguide device 10, such that the RF waveguide device 10 meets all performance specifications and functions as intended for a particular application. In other words, negatively impacting the performance of the RF waveguide device 10 means that the performance specifications and functions of the RF waveguide device 10 are not met in one or more ways due to one or more aspects or characteristics of the magic tee roof 30 RF component. Again, for example, if the surface finish is rough, insertion losses can increase rapidly. If multiple components are cascaded, the insertion loss continues to increase with each component. Surface roughness effects are especially detrimental at mmW frequencies, where features are comparative to a wavelength. As such, it is advisable to minimize surface roughness as much as possible. Also if the magic T is not symmetric, the phase difference between ports will be mismatched.

The unsupported surfaces 302, 304 of the magic tee roof 30 can be formed, such that the magic tee roof 30 creates a pyramidal void in the magic tee 18 formed between the waveguide channel 14 and the waveguide channel 13. That is, the magic tee roof 30 can form a pyramidal shaped void extending from the upper wall 141 of the waveguide channel 14 to a side wall 131 of the waveguide channel 13. A pyramidal shape can be defined generally as a polyhedron shape (a three-dimensional shape with flat polygonal faces, straight edges and sharp corners or vertices) with a polygonal base connected to a point via a plurality of triangular, lateral faces.

Figure 5B:
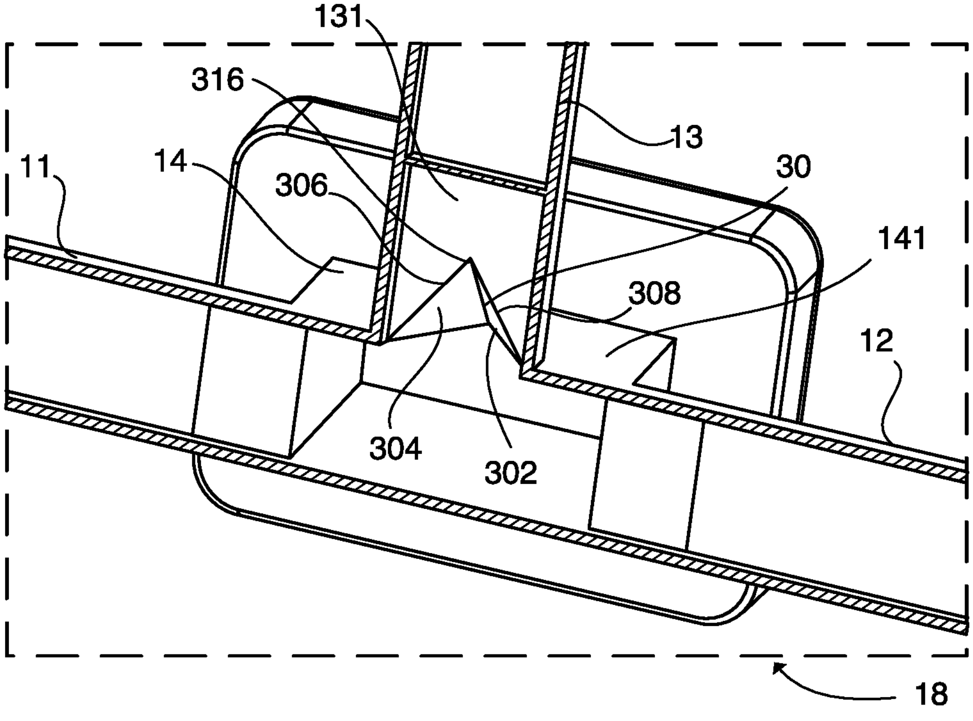
FIG. 5B is an isometric section view of the RF waveguide device of FIG. 1A, taken along the line C-C of FIG. 1B.
Figure 5C:
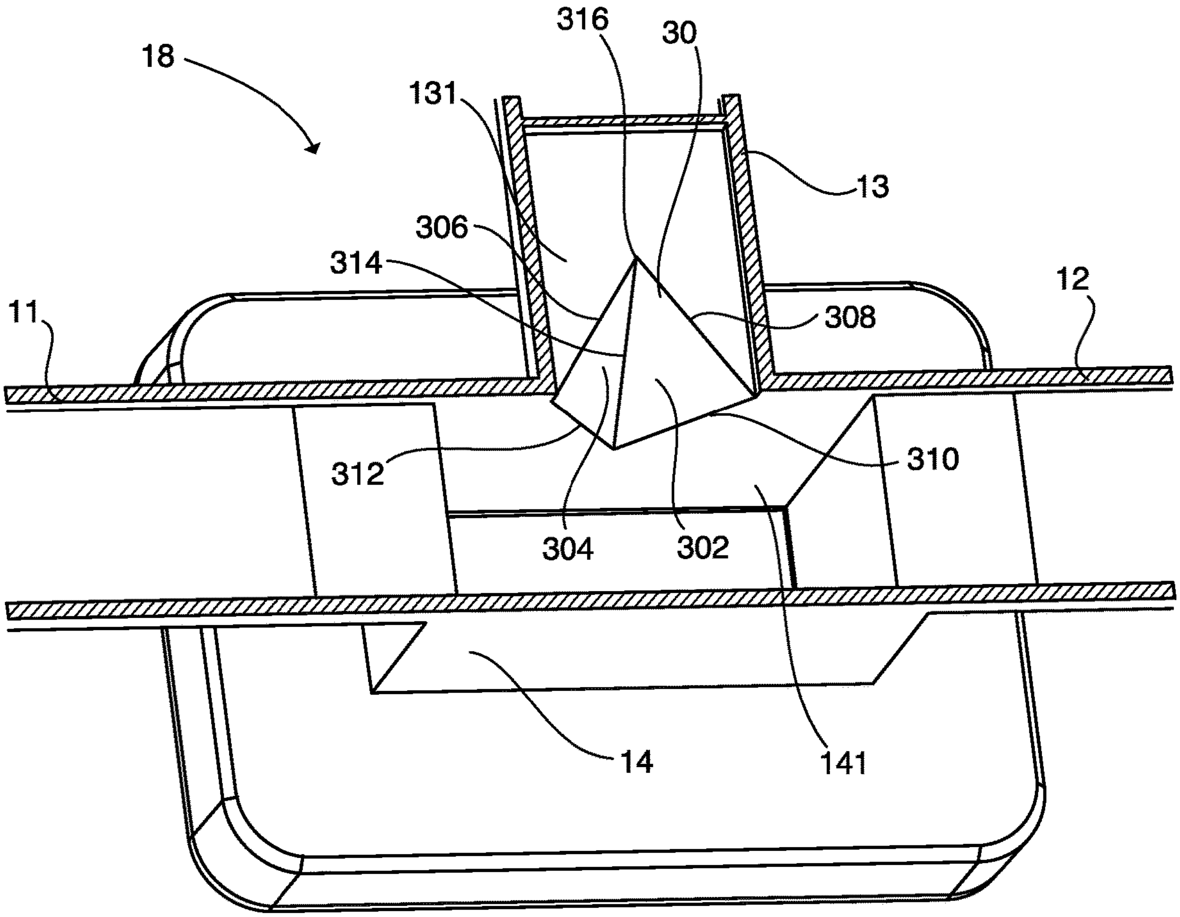
FIG. 5C is another isometric view of the RF waveguide device of FIG. 1A, taken along the line C-C of FIG. 1B.

As shown in FIGS. 5A-5C, the unsupported surface 302 can extend from an edge 310 formed in the upper wall 141 of the waveguide channel 14 to an edge 308 formed in the side wall 131 of the waveguide channel 13. The edge 310 extending along the upper wall 141 can extend at an oblique angle relative to a plane defined by the side wall 131 of the waveguide channel 13. The edge 308 along the side wall 131 of the waveguide channel 13 can extend at an oblique angle relative to a plane defined by the upper wall 141 of the waveguide channel 14. The edges 308, 310 can geometrically define the planar surface of the unsupported surface 302.

Similarly, the unsupported surface 304 can extend from an edge 312 formed in the upper wall 141 of the waveguide channel 14 to an edge 306 formed in the side wall 131 of the waveguide channel 13. The edge 312 extending along the upper wall 141 can extend at an oblique angle relative to the plane defined by the side wall 131 of the waveguide channel 13. The edge 306 along the side wall 131 of the waveguide channel 13 can extend at an oblique angle relative to the plane defined by the upper wall 141 of the waveguide channel 14. The edges 306, 312 can geometrically define the planar surface of the unsupported surface 304. The oblique angles of the edges 306, 308, 310, 312 relative to the planes defined by upper wall 141 and the side wall 131 can be the same or different. The oblique angles can be between 25 degrees and 65 degrees. In one example, the oblique angles can be 45 degrees.

The unsupported surfaces 302, 304 can join at a corner 314. The corner 314 can extend from the upper wall 141 of the waveguide channel 14 to the side wall 131 of the waveguide channel 13. The pyramidal shape of the magic tee roof 30 can thus be defined by the edges 310, 312 along the upper wall 141 forming a base of the pyramidal shape and the edges 306, 308 along the side wall 131 and the corner 314 extending from the upper wall 141 to the side 131 forming the top of the pyramidal shape culminating together at an apex 316 of the pyramidal shape. The pyramidal shape of the magic tee roof 30 can be a non-right pyramid with the apex 316 not being centered over the base of the pyramidal shape.

In the case of both the waveguide splitter 20 and the magic tee roof 30, RF waveguide components can be manufactured using additive manufacturing resulting in a span formed in a waveguide channel without the use of supporting structure, thus resulting in RF components that do not negatively impact the RF performance of the waveguide device. The waveguide RF components can be manufactured by building up or joining successive layers of a material to form the waveguide device including the RF components. Due to their configuration, the RF components can be built up without supporting structure needed by forming an unsupported surface of the RF component that extends from a wall of a waveguide channel in accordance with the concepts discussed herein. The RF components can be formed having the structure and finish described above with reference to both the waveguide splitter 20 and the magic tee roof 30.

Certain waveguides operating in high frequency ranges are often small in size and can easily be manufactured using additive manufacturing. However, larger format waveguides, such as C-band waveguides, are larger and require larger additive manufacturing devices to be manufactured. For example, a possible additive manufacturing process includes a Powder Bed Fusion (PBF) process that can include commonly used printing techniques such as direct metal laser sintering (DMLS), electron beam melting (EBM), selective heat sintering (SHS), selective laser melting (SLM) and selective laser sintering (SLS). Such PBF methods use heating elements as print sources such as a laser or electron beam to melt and fuse material powder together. The process sinters the powder, layer by layer until the full part is complete. Similar operations can be carried out with any other manufacturing methods known in additive manufacturing. As used herein, “print source” can refer to inkjets, binding jets, extruders, lasers, electron beams, print heads, or other heating devices to produce, extrude, melt, and fuse material known in additive manufacturing.

In larger scale additive manufacturing systems, two or more print sources can be required to cover a full range of the part being produced in the system. In cases in which multiple print sources are utilized, each print source can print in a print region individual to the specific print source and can print in a common region that is common to both of the two or more print sources.

By incorporating a RF component into a waveguide device that can be manufactured using additive manufacturing, large format waveguides with multiple RF components can be built for decreased cost and with decreased complexity. For example, by enabling additive manufacturing of RF components such as those discussed herein, a 20 to 1 brazement to additive part count reduction can be achieved which can significantly reduce manufacturing costs for the waveguide device.

While concepts in this disclosure are described with reference to large format waveguides, such as C-band waveguides, it will be understood that the principles, structures, and methods described herein can be applied to waveguides that operate to propagate any known frequency/wavelength of electromagnetic waves. The disclosure is not intended to be limited in any way to waveguides of certain operating ranges.

Figure 6:
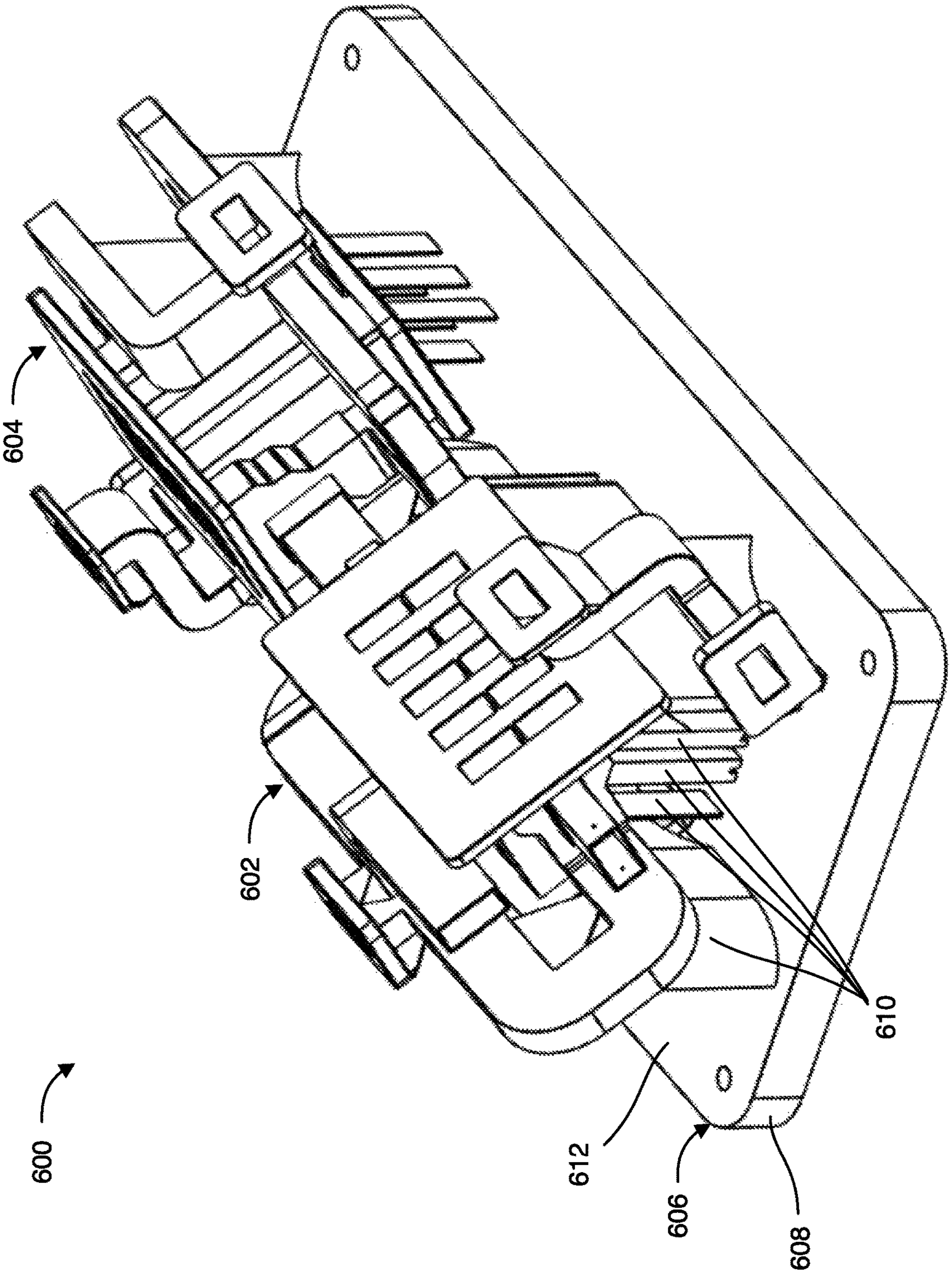
FIG. 6 illustrates a build plate for manufacturing a plurality of waveguides after the manner of the waveguide device shown in FIG. 1A, in accordance with examples of the present disclosure.

The manner and method of manufacturing the waveguide will be described with reference to FIG. 6. FIG. 6 illustrates an isometric view of an additive manufacturing system 600 for manufacturing a waveguide 602 and a waveguide 604, which can comprise any of the waveguide examples discussed herein, such as those with respect to FIGS. 1A-5C. The system 600 can comprise a build plate 606 having a base 608 and a plurality of build surfaces 610 on which the waveguides 602 and 604 are formed. In additive manufacturing of the waveguides 602 and 604, the method can comprise providing the build plate having one or more build surfaces for forming the waveguides 602 and 604. The method can further comprise successively layering material on the build plate in a build direction normal to a surface 612 of the base 608 of the base plate 606.

The method can further comprise forming a channel comprising an outer wall defining an inner cavity configured to propagate electromagnetic waves. The method can further comprise forming one or more components of the waveguides 602 and 604, including various RF components, such as the waveguide splitter and the magic tee roof as described above, and with reference to FIGS. 1-5C. During successive layering or joining of material on the build plate, steps of forming each component of a waveguide as described in this disclosure can be carried out.

As mentioned above, a build direction in which material is successively layered or joined on the build plate 606 can be normal to the surface 612 of the base 608 of the base plate 606. The build direction can be parallel to the pull of gravity. As shown, the waveguides 602, 604 are oriented at angles with respect to the build direction. For example, the build surfaces 610 can be formed, such that the waveguides 602, 604 can be substantially oriented at an angle of 45 degrees relative to the surface 612 of the build plate 606, and with respect to one another, as shown. That is, the build surfaces 610 can extend parallel to the build direction and the waveguides 602, 604 can be oriented at 45 degrees relative to the build direction.

Angling the build surfaces 610 and waveguides 602, 604 during successive layering or joining of material in an additive manufacturing process acts to decrease build defects and deformation during the additive manufacturing process. When a surface that is aligned with the build direction is printed, for example, the surface can be manufactured with little defects because layers of material are added or joined directly on top of each other in the build direction. However, deformations can be generated during the layering of an additive manufacturing fabrication when surfaces of a part being manufactured are angled relative to the build direction. Particularly, downward facing surfaces that face toward the base 608, such as a surface normal to the build direction facing toward the base 608, can have significant manufacturing defects due to the pull of gravity. Furthermore, manufacturing defects can also result from the thermal effects of the additive manufacturing process such as, for example, powder bed fusion (PBF). In thermal additive manufacturing processes such as PBF, plates and sections with downward facing surfaces having insufficient support can suffer from distortion due to poor thermal energy migration within the section. While the feature may physically resolve, poor thermal energy migration caused by insufficient support can cause the part to warp, which in waveguide manufacturing and operation is undesirable.

For example, due to the pull of gravity, forming surfaces parallel to the base 608 can cause significant mechanical defects such as warping, collapse, breakage, or others unless elements are provided to support the part being manufactured. Such defects tends to occur at locations where one or more walls of the component being manufactured encounters a significant transition (e.g., an angle approaching 0° or parallel to the base 608) in the build direction. As surfaces approach being oriented parallel to the build direction BD from being perpendicular to the build direction, stability of surfaces improves and manufacturing defects are decreased. Therefore, it is desirable to maintain the angles between different surfaces within a prescribed range of 45°+/−25° to prevent defects from occurring.

At 45° orientations, such as the angle of the waveguides 602, 604 relative to the build direction shown, manufacturing defects are reduced and waveguides can be manufactured with more reliability and predictability. It is noted that in some instances, there can still be surfaces oriented parallel to the base 608 even when the waveguides 602, 604 are oriented at an angle relative to the base 608. For example, in the case of the waveguide splitter 20 discussed above with references to FIGS. 1A-4D, the waveguide splitter can comprise a single or double-beveled profile forming a blade-like edge, as shown in FIG. 4A. During fabrication, because the waveguide splitter 20 would be oriented at an angle relative to a direction normal to the surface 612 of the base 608 of the build plate 606, one of the surfaces of the double-beveled, or the single beveled edge, can be formed having an orientation parallel to the surface 612. However, it has been demonstrated that it is possible to fabricate such unsupported surfaces normal to the build direction provided that they are less than approximately 2 mm in height. However, such surfaces can still exhibit excessive roughness and can be suitable only in certain applications. It is noted that unsupported surfaces having a height greater than 2 mm can increase the possibility of build failure, as well as increase the probability of the formation of dross, which can negatively impact performance in a RF waveguide device. In the example waveguides discussed herein, the single or double-beveled surfaces can be 2 mm or less.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, for forming a radio frequency ("RF") waveguide device by additive manufacturing, the method comprising:

fabricating a RF channel comprising at least one wall; and fabricating a RF component comprising an unsupported span extending from the at least one wall of the RF channel, wherein the unsupported span is formed at least in part by building up a first unsupported surface to extend from one of the at least one wall at a first oblique angle relative to the angle and a second unsupported surface to extend from one of the at least one wall at a second oblique angle, wherein the first and second unsupported surfaces join together at an apex between the first and second unsupported surfaces, wherein the unsupported span is fabricated without the use of an underlying supporting structure, wherein the unsupported span is completed using additive manufacturing without post processing machining, wherein the RF component comprises a waveguide splitter disposed within a horn section of the RF channel, and wherein the first and second unsupported surfaces join together to form a chevron profile on the waveguide splitter.

2. The method of claim 1, wherein the unsupported surface is fabricated with a surface finish with a Ra of less than 250 micro inches.

3. The method of claim 1, wherein the first oblique angle and the second oblique angle are is between 25 degrees and 65 degrees relative to the the at least one wall.

4. The method of claim 1, wherein the first oblique angle is equal to the second oblique angle.

5. The method of claim 1, wherein the at least one wall includes a first wall and a second wall, wherein the first unsupported surface extends from the first wall and the second unsupported surface extends from the second wall and are joined together at the apex between the first and second walls.

6. A method, for forming a radio frequency ("RF") waveguide device by additive manufacturing, the method comprising:

fabricating a RF channel comprising at least one wall; and fabricating a RF component comprising an unsupported span extending from the at least one wall of the RF channel, wherein the unsupported span is formed at least in part by building up at least one unsupported surface to extend from the at least one wall at an oblique angle relative to the wall, wherein the unsupported span is fabricated without the use of an underlying supporting structure, wherein the unsupported span is completed using additive manufacturing without post processing machining, wherein the at least one unsupported surface is fabricated in an arced profile on the unsupported span.

7. The method of claim 6, wherein the at least one wall includes a first wall and a second wall, wherein the unsupported span is formed at least in part by building up a first unsupported surface to extend from the first wall and building up a second unsupported surface to extend from the second wall that join together at an apex between the first and second unsupported surfaces, wherein the first and second unsupported surfaces form the arced profile on the unsupported span.

* * * * *